3,034,600
EXTERNAL BAND BRAKE
Harmond E. Berno, Farmington, Mich., assignor to Ford Motor Company, Dearborn, Mich., a corporation of Delaware
Filed Aug. 21, 1959, Ser. No. 835,255
1 Claim. (Cl. 188—77)

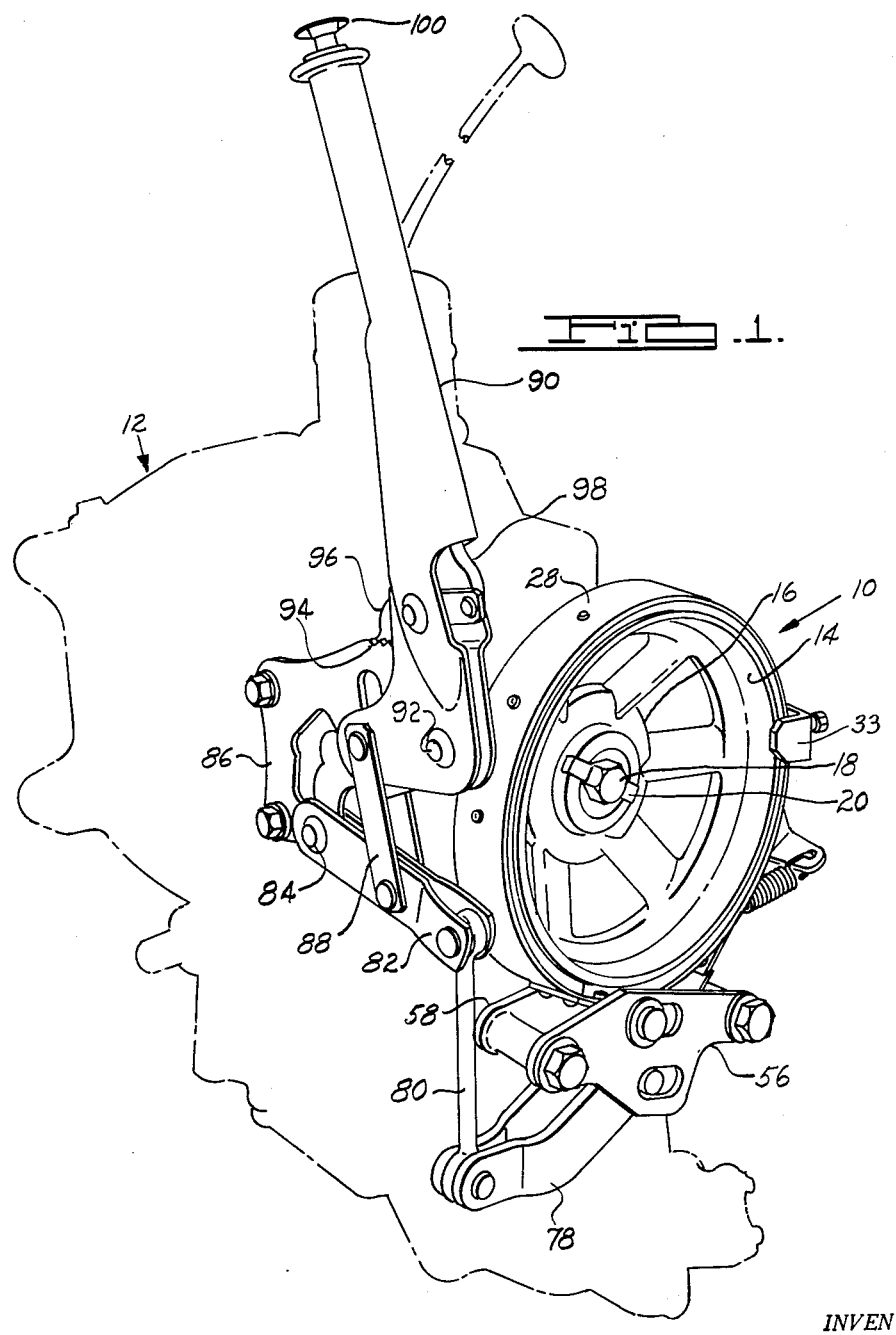

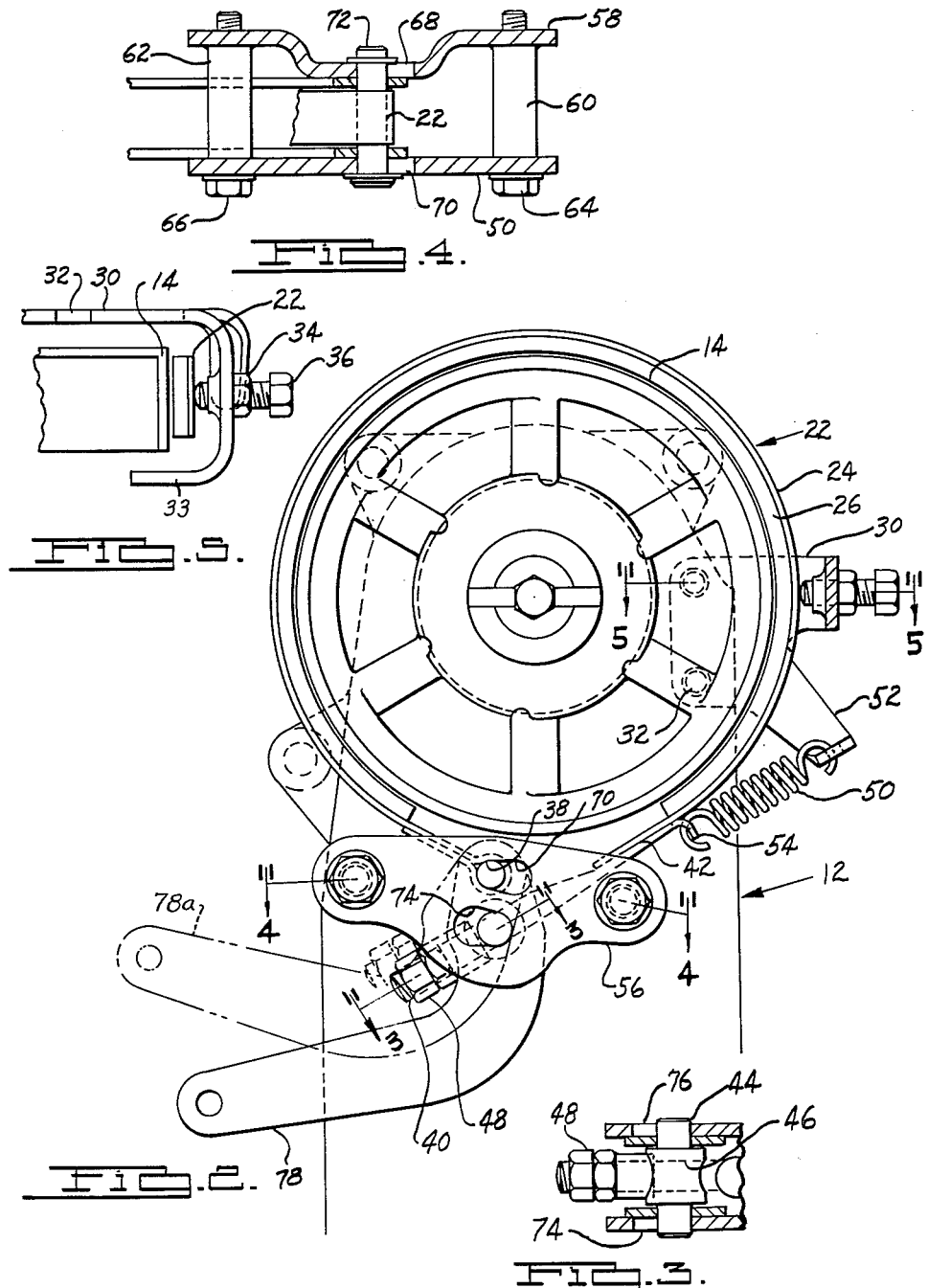

The present invention relates to brakes and more particularly to external wrap-around band brakes for motor vehicles.

Broadly, the invention comprehends an external band brake and in the illustrated preferred embodiment the free ends of a wrap-around brake band are pin mounted in elongated slots and actuated by a double fulcrum lever. The slotted engagement of the band ends permits limited movement of the brake band upon its engagement with the brake drum with which it is associated. The actuating lever can pivot about either of the band's pinned ends to draw the band by its other end into engagement with the brake drum. The double fulcrum functionality of the actuating lever, as permitted by its connection with the slidably mounted ends of the brake band, provides a band brake assembly that is self assisting in braking action independent of the direction of brake rotation.

Therefore, it is an object of the present invention to provide a wrap-around band brake which is characterized by its self-energization in both forward and reverse rotation of the brake drum.

It is another object of the present invention to provide a band brake for use as a motor vehicle parking brake which is further distinguished by its simplicity of construction and reliability of operation.

These and further objects of the present invention will become apparent from the following detailed discussion and the accompanying drawings in which:

FIGURE 1 is a perspective view of a band brake embodying the present invention operatively attached to a vehicle transmission which is shown in phantom;

FIGURE 2 is an elevational view of the brake of FIGURE 1;

FIGURE 3 is a sectional view taken along section lines 3—3 of FIGURE 2;

FIGURE 4 is a sectional view taken along section lines 4—4 of FIGURE 2; and

FIGURE 5 is a sectional view taken along section lines 5—5 of FIGURE 2.

Referring now to the drawings for a more specific description of the present invention wherein there is disclosed in FIGURE 1 a band brake 10 attached to a vehicle transmission shown by phantom line 12. It will be readily apparent that the brake 10 is equally adaptable to other configurations and applications while still embodying the concepts of the present invention.

Brake 10 is comprised of a brake drum 14 which has an external cylindrical braking surface. Drum 14 has a hub portion 16 affixed to the output shaft of the transmission 10 by means of a bolt 18 and a key 20. Thus, the drum 14 is keyed to rotate with the output of the prime mover with which the transmission 12 is associated or in the alternative to hold that output against rotation by means that are about to be described.

A brake band 22 having an exernal metallic strip 24 and an internal frictional lining 26 attached thereto by means of rivets 28 is disposed circumferentially about the braking surface of the drum 14. Band 22 is held in position by the brake supporting structure which includes a guide member 30 formed of a metal stamping. The guide 30 is secured to the housing of the transmission 12 by means of bolts which pass through bolt holes 32. The guide member 30 has a generally hooked shaped portion 33 which extends about sides of the band 22 and drum 14 to prevent the band 22 from slipping off the drum 14.

A nut 34 is welded to the member 30 and receives a bolt 36 which has one end in contact with the band 22. The bolt 36 provides an adjustment to control the clearance between the band 22 and the drum 14 when the band 22 is spring urged to a deactivated position.

One end of the strip 24 is doubled back upon itself to provide an eye 38 in which a pin 72 is contained. The other end of the strip 24 has a threaded fitting 40 spot welded thereto at 42. A special pin 44 having a perpendicular bore 46 is passed over the fitting 40. The ends of the pins 72 and 44 extend beyond the width of the band 22. An adjusting nut 48 is carried on the threads of the fitting 40 to position the pin 44.

A retracting spring 50 is interposed between an arm 52 formed as part of the guide member 30 and a spring bracket 54 affixed to the band 24. Spring 50 pulls the brake band 22 away from the drum 14 to a deactivated position.

An anchor support is provided to receive the pinned ends of the brake band 22. The support consists of two parallel plates 46 and 58 that are positioned spaced apart by tubular spacers 60 and 62. Bolts 64 and 66 pass through the spacers 60, 62 to hold the plates 56, 58 and have their protruding ends threadably received in the housing of the transmission 12.

The plates 56, 58 are provided with pairs of aligned elongated slots. One set of elongated slots 68 and 70, shown in FIGURE 4, receives the pin 72 that passes through the eye 38 formed in one end of the brake band 22. A second set of elongated slots 74 and 76 is disclosed in FIGURE 3 which receives the extending ends of pin 44. It will be noted from the drawing that the pinned ends of the band 22 are held by the plates 56, 58 in a relatively close relationship.

A double fulcrum actuating lever 78 of generally L-shaped configuration is provided. Lever 78 is of bifurcated construction having sets of aligned holes through which the pins 44 and 72 pass. Thus, the ends of the band 22 are pinned to the end of the actuating lever 78 as well as being slidably received in the supporting plates 56 and 58.

In operation, when the brake drum 14 is rotated in a counterclockwise direction as seen in FIGURE 2 and a braking action is desired, the lever 78 is pulled upwardly to a position shown by dotted line 78a (FIGURE 2) by means which will later be described. This upward movement of the lever 78 urges the pins 44 and 72 to be moved so as to reduce the diameter of the brake band 22. When the lining 26 engages the drum 14, it will tend to rotate with it and pull pin 44 to the right hand edge of he elongated slots 74, 76. The right hand edge of the slots 74, 76 will then constitute a reaction point permitting the pin 44 to function as a fulcrum. Further movement of the lever 78 will cause the pin 72 to be moved to the right in a small arc about pin 44 as a fulcrum. This action will contract the band 22 about the drum 14. The engagement of the lining 26 with the drum 14 will tend to tighten the band 22 about the drum 14 as it is urged in the same direction in which the lever 78 is forcing the pin 72. Thus, a self-energizing action will exist.

The foregoing described band brake is also self-energizing for clockwise rotation. When the drum 14 is rotating clockwise and the outer end of the lever 78 is pulled upwardly to 78a, the frictional lining 26 will engage the drum 14 which will tend to cause the band 22 to also rotate in a clockwise direction. The forces tending to cause that movement will pull the pin 72 against the left hand edge of the elongated slots 68, 70. For clockwise rotation, the pin 72 will now act as a fulcrum and the contracting action of the band 22 will be caused by the forced movement of the pin 44 to the left. The contact of the band 22 with the drum 14 tends to rotate the band 22 in clockwise direction which is also the motion imparted to it by the lever 78.

Thus, regardless of direction, the very engagement of the band 22 with drum 14 is assisting the further application of the brake by the lever 78 and a self-energizing action results. Therefore, the band brake of the present invention is self-energizing for both forward and reverse rotation.

Means are provided to draw the lever 78 upwardly to effect a braking action. Such means include a link 80 which is pivotally connected to one end of a third class lever 82. Lever 82 has its fulcrum at a pin 84 which is threadably carried by a supporting structure 86 bolted to the transmission housing 12. A second link 88 is pivotally connected to the middle of the lever 82 and has its one end similarly connected to a brake handle 90, a first-class lever. The handle 90 has its fulcrum at pin 92 that is also threadably carried by the supporting structure 86. Thus, in the just described structure, when the brake handle 80 is rotated clockwise as seen in FIGURE 1 so as to pivot about the point 92, link 88 is drawn upwardly which, in turn, pulls link 82 upwardly and that force is transmitted through link 80 to actuating lever 78.

A series of ratchet teeth 94 are provided on the structure 86 that are engaged by a pawl 96 carried by the brake handle 90. A release mechanism which includes a push rod 98 and a button 100 are provided in association with the pawl 96. This ratchet mechanism allows the brake handle 90 to be pulled in a clockwise direction so as to engage the brake band and to hold the brake band in that engaged position in a well-known manner. Application of force to the button 100 disengages the pawl 96 so that the lever 90 may be returned to a deactivated position.

The foregoing description constitutes the preferred embodiment of a simplified band brake which is self-energizing in both directions of brake drum rotation. It is obvious that modifications will occur to those skilled in the art which will come within the scope and spirit of the appended claim.

What is claimed is:

A brake having a brake drum with an external cylindrical braking surface, a frictionally lined brake band surrounding said surface, the ends of said band being positioned in spaced apart relationship, said band ends having pin means, a supporting structure, elongated slots provided in said supporting structure, said pin means being slidably received within said slots, an L-shaped double fulcrum lever connected to said pin means and adapted to pivot about either of said pin means as its fulcrum while drawing the other pin means in a braking action, a hand brake lever pivotally mounted on said supporting structure to move in a plane perpendicular to the plane of said double fulcrum lever, link means interconnecting said fulcrum lever and said hand lever for actuation of said fulcrum lever by said hand lever, said link means including a first link pivotally mounted on said supporting structure, a bipartite second link interconnecting said hand lever and said first link, and a rod-like third link interconnecting said first link and said fulcrum lever, the ends of said third link being pivotable about axes that lie in said perpendicular planes.

References Cited in the file of this patent

UNITED STATES PATENTS

| | | |
|---|---|---|
| 779,111 | Ball | Jan. 3, 1905 |
| 1,663,785 | White et al. | Mar. 27, 1928 |
| 1,941,167 | Fishburn | Dec. 26, 1933 |
| 1,947,823 | Brey | Feb. 20, 1934 |
| 2,164,300 | Smith | June 27, 1939 |
| 2,854,858 | Butterfield et al. | Oct. 7, 1958 |

FOREIGN PATENTS

| | | |
|---|---|---|
| 219,803 | Great Britain | Aug. 7, 1924 |